Oct. 28, 1941.  F. B. HALFORD ET AL  2,260,283
BALL AND SOCKET JOINT
Filed Oct. 14, 1938   2 Sheets-Sheet 2
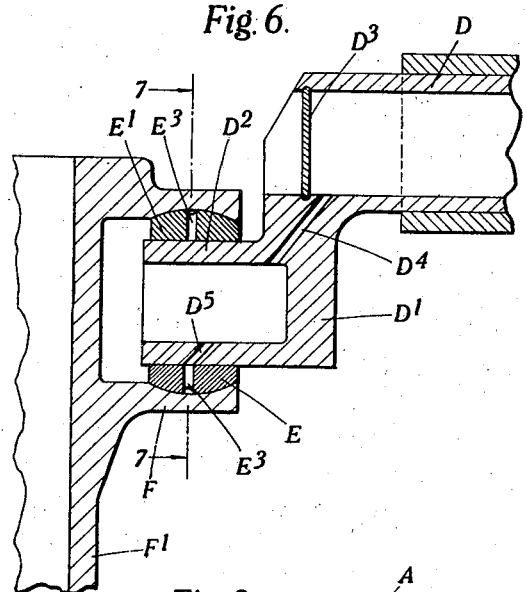
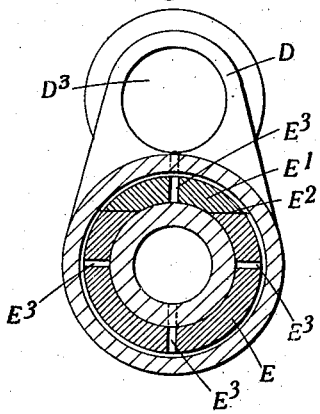
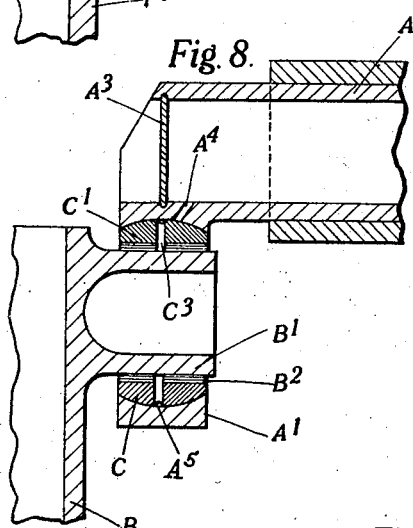
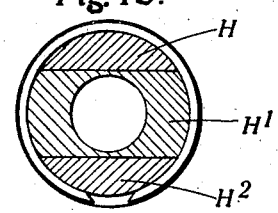
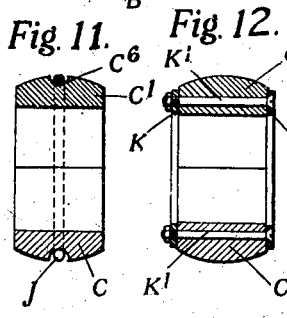
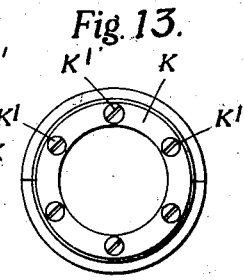
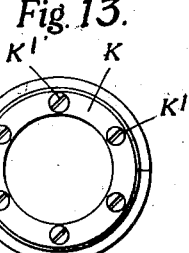
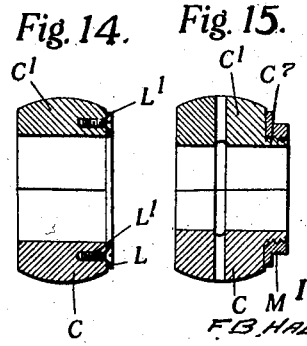
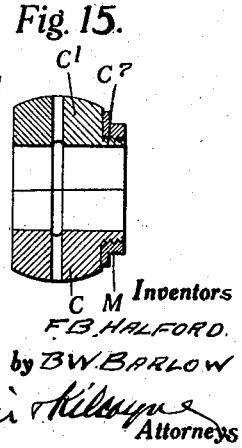
Inventors
F. B. HALFORD.
by B. W. BARLOW
Attorneys Patented Oct. 28, 1941

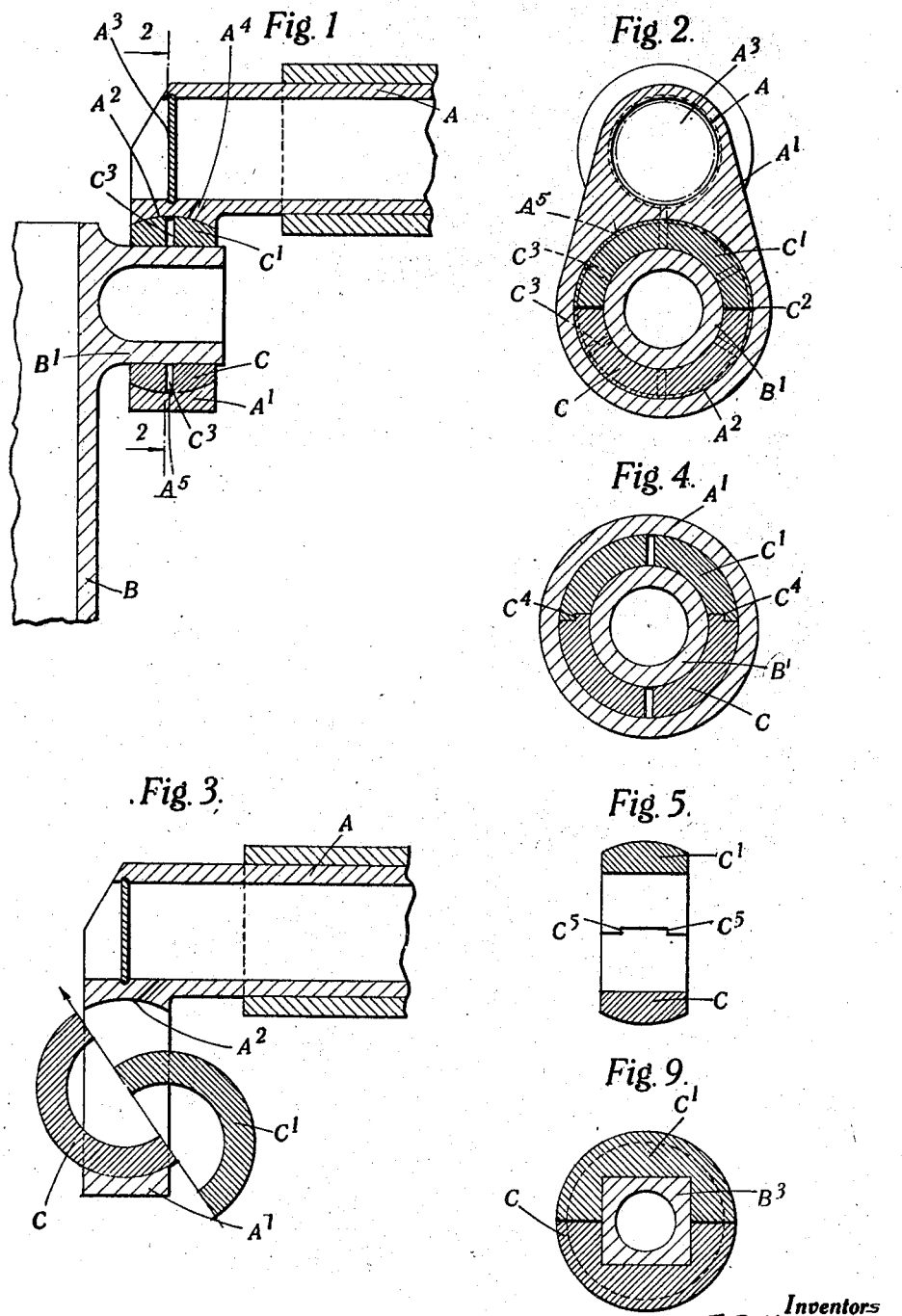

2,260,283

UNITED STATES PATENT OFFICE 2,260,283

BALL AND SOCKET JOINT

Frank Bernard Halford, Edgware, and Benjamin William Barlow, London, England, assignors to D. Napier & Son Limited, London, England, a company of Great Britain Application October 14, 1938, Serial No. 235,024
In Great Britain October 26, 1937

14 Claims. (Cl. 308—72)

This invention relates to ball and socket joints of the kind comprising a socket having an annular part-spherical inner surface and a ball member adapted to lie within the socket and having an annular part-spherical outer surface and a bore adapted to be engaged by a pin.

For the sake of convenience the axis of the annulus constituted by the part-spherical surface of the ball member will be referred to as the axis of the ball member while similarly the axis of the annulus constituted by the part-spherical inner surface of the socket will be referred to as the axis of the socket.

Such ball and socket joints are employed, for example, to connect a sleeve valve to mechanism for imparting to it a combined oscillating and reciprocating movement and comprising a crank rotating about an axis at right angles to the axis of the sleeve valve and connected to the sleeve valve through a ball and socket joint of the kind in question. In this case the socket may be formed or mounted in the sleeve valve while a crank pin engages the bore in the ball member or the socket may be carried or formed in the crank while the pin which engages the bore in the ball member is mounted on the sleeve valve.

Hitherto in such joints, in order to provide for assembly of the joint, the ball member has comprised a hard metal skeleton which is inserted into the socket, the skeleton having a bore into which the pin can project, the space between the outer surface of the skeleton and the bore of the socket and the skeleton and a dummy pin being filled with white metal and the dummy pin subsequently removed to permit insertion of the pin of the apparatus with which the ball joint is to be used. The operation of white-metalling is difficult in practice as great care must be observed to ensure concentricity of the parts, good adhesion between the white metal and the material of the ball and suitable working clearances between parts having relative motion. It has been found, moreover, that in some cases the white metal bearing surfaces thus produced do not stand up satisfactorily to prolonged use under heavy load. It has also been proposed to employ a socket member which is formed in two parts held together by bolts in such a way that an integral ball member can be used. This construction is, however, cumbersome and adds inertia to the valve mechanism.

The object of the present invention is to provide an improved ball and socket joint of the kind referred to capable of operating satisfactorily for prolonged periods without excessive wear of the bearing surfaces.

To this end a ball and socket joint of the kind referred to according to the present invention comprises a one-piece socket and an annular ball member formed in two or more separable parts, the abutting or adjoining surfaces of which are disposed in planes parallel to the axis of the complete ball member. The socket and ball member are further so dimensioned and constructed that one ball part can be inserted first into the one-piece socket whereupon the other part or parts can be inserted by sliding the abutting faces thereof over one another to form the complete ball member prior to insertion of the pin which, when inserted, serves either directly or indirectly to maintain the parts of the ball member assembled. Thus the ball member can be formed throughout of a hard bearing metal such as phosphor bronze as was hitherto impossible with a one-piece socket unless a considerable area of the bearing surface of the socket was machined away to permit insertion of the ball member into the socket. Alternatively each part of the ball member may be coated on its part-spherical surface with white metal or like bearing metal before the parts are inserted into the socket, and in this case accurate concentricity of the parts and the provision of suitable working clearances and of oil grooves or passages when provided is easier than with the prior arrangement referred to in which a one-piece skeleton was inserted into the socket and white metal was then cast between the skeleton and the socket.

Preferably the annular ball member is formed in two part-annular circumferential parts one of which can be inserted with its axis at right angles to that of the socket and then turned into its normal position when it enables the other to be inserted similarly with its axis at right angles to that of the socket and turned into its normal position to complete the ball member, whereupon the insertion of the pin into the bore of the ball member, which is formed by recesses in the adjacent faces of the two parts, maintains the two parts coaxial and therefore prevents their relative displacement. In such an arrangement each part of the annular ball member conveniently constitutes one half of the circumference of the annulus but other arrangements may be employed.

In an alternative arrangement the annular ball member may comprise two parts of which the part to be inserted second into the socket comprises less than half the circumference of the annulus and can be inserted directly into its correct position relative to the first part through the open end of the socket when the first part, after insertion, is turned in the socket so that its axis lies at right angles to that of the socket with the gap to receive the second part facing the open end of the socket. In any case the abutting faces of the parts of the annular ball member may be formed to interlock in such a manner as to prevent relative displacement of these parts either in one direction only or in all directions in planes parallel to the abutting faces.

Further, the two or more parts of the ball may be restrained from "chatter" by a spring circlip passing round a groove in their outer circumference or by an end plate or ring nut or a series of bolts or dowels at one or each end of the ball member serving to clamp the various parts of the ball together after assembly.

The ball member may be provided with oil passages passing from its bore to its outer surface with or without oil grooves formed in the surface of its bore or in its outer surface or in the abutting surfaces between the different parts of the ball or in two or more of these surfaces, while its bore may be adapted to engage the pin directly or may have inserted therein a sleeve forming a bearing surface for the pin. Again, the socket may either be constituted by or connected to a part of one of the two members to be coupled together by the ball and socket joint.

The metal of which the ball member is made may vary but conveniently the ball member is formed of some such metal as phosphor bronze while the socket is formed of steel or other ferrous metal. One or more of the associated parts may further be hardened or plated to provide an improved bearing surface and diminish wear.

The bore of the ball member and the surface of the pin which engages it may be cylindrical or of square or other cross-section.

The following is a description by way of example only of one construction according to the invention suitable, for example, for use in mechanism for imparting a combined oscillating and reciprocating motion from a crank to a sleeve valve.

A number of constructions according to the invention are illustrated by way of example in the accompanying drawings, in which Figure 1 is a cross-section showing one form of flexible joint according to the invention as applied to mechanism for imparting a combined oscillating and reciprocating movement to a sleeve valve, Figure 2 is a section on the line 2—2 of Figure 1, Figure 3 illustrates how the two parts of the ball member in the construction shown in Figures 1 and 2 may be inserted into the socket, Figures 4 and 5 show respectively in transverse and longitudinal cross-section two modifications of the construction shown in Figures 1 and 2, Figure 6 shows an alternative form of flexible joint according to the invention also as applied to driving mechanism for imparting a combined oscillating and reciprocating movement to a sleeve valve, Figure 7 is a section on the line 7—7 of Figure 6, Figure 8 shows a modification of the construction shown in Figures 1 and 2, Figures 9 and 10 show in transverse cross-section two further modifications according to the invention, Figure 11 is a longitudinal section of a still further modification according to the invention, Figure 12 is a similar view to Figure 11 of another modification, Figure 13 is an end elevation of the construction shown in Figure 12, and Figures 14 and 15 show two additional modifications.

In the construction shown in Figures 1 and 2, the flexible joint is employed to connect a crankshaft A to a sleeve valve B to be operated thereby, and to this end the crankshaft A is provided with a crank $A^1$ in which is formed a socket having an annular part-spherical surface $A^2$. Disposed within the socket is a ball member C, $C^1$ having a cylindrical bore which engages a cylindrical pin $B^1$ projecting from the sleeve B and an annular part-spherical outer surface. As shown most clearly in Figure 2, the ball member comprises two separate parts C, $C^1$ each of half-annular form having an abutting face $C^2$. While the abutting faces of the ball parts as shown in Fig. 2 actually lie in planes parallel to the axis of the complete ball, the line of division between the assembled ball parts may be said to lie in a unitary plane which contains the axis of the complete ball member. To assemble the ball member, the half-annular part C of the ball member is first inserted into the socket with its axis at right angles to that of the socket and is then brought into the position shown in Figure 3 whereupon the part $C^1$ is slid into position within the socket in the direction of the arrow to complete the ball member and this ball member is then rotated within the socket to bring the axis thereof into coincidence with the axis of the socket whereupon the pin $B^1$ is inserted into the bore of the socket and thus maintains the parts assembled.

Alternatively the part C may first be inserted into the socket with its axis at right angles to that of the socket and then turned into its normal position when the other part $C^1$ can be similarly inserted and turned into its normal position whereupon insertion of the pin maintains the two parts C and $C^1$ coaxial.

In the construction illustrated the crankshaft A is hollow and has its end closed by a diaphragm $A^3$. The socket is lubricated by oil delivered through the interior of the crankshaft A and thence through a hole $A^4$ to the part-spherical surface of the socket from which it passes through an annular groove $A^5$ in the outer circumference of the ball member and holes $C^3$ in the ball member to the cylindrical surface of the pin $B^1$.

In the modification illustrated in Figure 4 the abutting faces of the parts C, $C^1$ are provided with interlocking shoulders $C^4$ which prevent relative movement between the parts C, $C^1$ in a direction at right angles to the axis of the ball member while in the modification illustrated in Figure 5 these abutting faces have interlocking engagement with shoulders $C^5$ which prevent relative movement between the parts C, $C^1$ in a direction parallel to the axis of the ball member.

In the construction shown in Figures 6 and 7 the apparatus comprises a crankshaft D having a crank $D^1$ thereon provided with a crank pin $D^2$ which engages a cylindrical bore in a ball member E, $E^1$ having an annular part-spherical outer surface engaging the corresponding annular part-spherical inner surface of a socket F formed on a sleeve valve F¹. In this construction the part E of the ball member constitutes more than half the circumference of this member and the part E¹ thus constitutes less than half this circumference, as shown in Figure 7, and the parts are assembled by first inserting the part E into the socket with its axis at right angles to that of the socket and then turning it about its axis until the surface E² to be engaged by the part E¹ is exposed through the open end of the socket. The part E¹ is then placed in position and the ball member as a whole is rocked so as to bring its axis coincident with that of the socket whereupon the pin D² is inserted into the bore of the ball member.

In this construction also the crankshaft D is hollow and has its end closed by a diaphragm D³, lubricating oil being delivered from the interior of the crankshaft D through a hole D⁴ into the interior of the hollow crank pin D² from which it passes through one or more holes D⁵ to the cylindrical surface of the crank pin D² and thence through holes E³ in the ball member to the part-spherical surfaces.

Figure 8 illustrates a modification of the construction shown in Figures 1 and 2 in which the pin B¹, instead of directly engaging the bore in the ball member C, C¹, engages a bushing B² within this bore. In this construction the method of assembly is the same as that described with reference to Figure 3 but the bushing B² is inserted before insertion of the pin B¹ into the bushing.

In the modification illustrated in Figure 9, which is shown by way of example as applied to the construction shown in Figures 1 and 2, instead of a pin B¹ or D² of circular cross-section, a pin B³ of square cross-section is employed and the bore in the two-part ball member C, C¹ is correspondingly of square cross-section so that the pin B³ prevents relative rotation between the ball member and the pin.

In the construction of ball member shown in Figure 10, which may also be employed for example in the construction shown in Figures 1 and 2, the ball member is also formed in three parts H, H¹, H² but in this case the divisions between the parts, instead of being radial, are in the form of chords, as shown.

Figures 11-15 illustrate various ways in which the parts of a ball member employed in a joint according to the invention may be held together when once assembled so that even when the pin is removed they will not be apt to come apart. Thus, in Figure 11, the ball member C, C¹ is provided with an annular groove C⁶ in its circumference engaged by a spring ring or circlip J, the circlip being completely housed within the groove.

In the construction shown in Figures 12 and 13 the parts C, C¹ when assembled are held together by end plates K secured to the ends of the ball member by bolts K¹ which pass through the parts of this ball member.

In the construction shown in Figure 14, the parts of the ball member are maintained in their assembled position by a single plate L secured to one end of the ball member by screws L¹ engaging the parts of this ball member.

In the construction shown in Figure 15 the parts C, C¹ of the ball member are formed so as to provide at one end an externally screwthreaded hollow boss C⁷ which is engaged by an internally screwthreaded ring M to hold the parts together.

What we claim as our invention and desire to secure by Letters Patent is:

1. A ball and socket joint comprising an annular one-piece socket having an annular part-spherical inner surface, an annular ball member having an annular part-spherical outer surface, and a pin adapted for insertion into the bore of the ball member, the ball member comprising at least two separable parts whose abutting faces are parallel to the axis of the ball member, each ball part constituting a circumferential part of the annular outer surface of the ball, and the ball parts being arranged and dimensioned with reference to the socket so that one ball part can be inserted first into the socket whereupon the other part or parts can be inserted to form the complete ball member prior to insertion of the pin into the bore.

2. A ball and socket joint comprising an annular one-piece socket having an annular part-spherical inner surface, an annular ball member having an annular part-spherical outer surface, and a pin adapted for insertion into the bore of the ball member, the ball member comprising at least two separable parts whose abutting faces are parallel to the axis of the ball member, each ball part constituting a circumferential part of the annular outer surface of the ball, and the ball parts being arranged and dimensioned with reference to the socket so that one ball part can be inserted first into the socket whereupon the other part or parts can be inserted to form the complete ball member prior to insertion of the pin which, when inserted, serves to maintain the parts of the ball member assembled.

3. A ball and socket joint comprising an annular one-piece socket having an annular part-spherical inner surface, an annular ball member having an annular part-spherical outer surface and a pin adapted for insertion into the bore of the ball member, the ball member comprising at least two separable parts whose abutting faces are parallel to the axis of the ball member, each ball part constituting a circumferential part of the annular outer surface of the ball, the ball parts being arranged and dimensioned with reference to the socket so that one ball part can be inserted first into the socket whereupon the other part or parts can be inserted to form the complete ball member prior to insertion of the pin, and means engaging the ends of the ball member for connecting the parts thereof together.

4. A ball and socket joint comprising an annular one-piece socket having an annular part-spherical inner surface, an annular ball member having an annular part-spherical outer surface, a pin adapted for insertion into the bore of the ball member, the ball member comprising at least two separable parts whose abutting faces are parallel to the axis of the ball member, each ball member constituting a circumferential part of the annular outer surface of the ball, and the ball parts being arranged and dimensioned with reference to the socket so that one ball part can be inserted first into the socket whereupon the other part or parts can be inserted to form the complete ball member prior to insertion of the pin, and a plate secured to at least one end of the ball member and secured to each of the parts thereof to maintain these parts assembled.

5. A ball and socket joint comprising an annular one-piece socket having an annular part-spherical inner surface, a ball member having an annular part-spherical outer surface, a pin adapted for insertion into the bore of the ball member, the ball member comprising at least two separable parts whose abutting faces are parallel to the axis of the ball member, each ball member constituting a circumferential part of the annular outer surface of the ball, and the ball parts being arranged and dimensioned with reference to the socket so that one ball part can be inserted first into the socket whereupon the other part or parts can be inserted to form the complete ball member prior to insertion of the pin, and plates secured to the two ends of the ball member by bolts passing through each of the parts thereof to maintain these parts assembled.

6. A ball and socket joint comprising an annular one-piece socket having an annular part-spherical inner surface, an annular bowl member having an annular part-spherical outer surface and a pin adapted for insertion into the bore of the ball member and to have sliding engagement therewith, the ball member being formed in two parts which have abutting surfaces lying in planes parallel to the axis of the complete ball member and each ball part providing a circumferential part of the annular outer surface of the ball, the ball parts being arranged and dimensioned with reference to the socket so that one part can be inserted with its axis at right angles to that of the socket and then turned into its normal position and so that the other part han be inserted into the socket and slid over the one part into normal position to complete the ball member, whereupon the insertion of the pin maintains the two parts coaxial and therefore prevents their relative displacement.

7. A ball and socket joint comprising an annular one-piece socket having an annular part-spherical inner surface, an annular ball member having an annular part-spherical outer surface and a pin adapted for insertion into the bore of the ball member, the ball member being formed in two parts which have abutting surfaces lying in planes parallel to the axis of the complete ball member and each ball part providing a circumferential part of the annular outer surface of the ball, the ball parts being arranged and dimensioned with reference to the socket so that one part can be inserted with its axis at right angles to that of the socket and then turned about its axis until the faces to be engaged by the other part lie in a plane which is inclined to the axis of the socket and so that the other part can then be moved into position with its corresponding surfaces moving along this inclined plane, the ball member as a whole then being turnable within the socket so that its axis lies parallel to the axis of the socket whereupon the pin can be inserted.

8. A ball and socket joint comprising the elements set forth in claim 6 in which each part of the annular ball member constitutes one half of the circumference of this member.

9. A ball and socket joint comprising the elements set forth in claim 7 in which each part of the annular ball member constitutes one half of the circumference of this member.

10. A ball and socket joint comprising the elements set forth in claim 2 in which the socket member is formed integral with a sleeve valve of a fluid pressure engine.

11. The combination with a crankshaft having a crank thereon, of an annular one-piece part-spherical socket formed in the crank, an annular ball member having an annular part-spherical outer surface disposed in the socket, the ball member comprising at least two separable parts whose abutting faces are parallel to the axis of the ball member, each ball part constituting a circumferential part of the annular outer surface of the ball and one of which can be inserted first into the socket whereupon the other part or parts can be inserted to form the complete ball, a pin rigidly secured to a member to be coupled to the crank and slidingly engaging the bore of the ball member, means for supplying lubricating oil through the crankshaft to the part-spherical surface of the socket, and holes in the parts of the ball member through which lubricating oil can flow from this part-spherical surface to the bore of the ball member.

12. The combination with a crankshaft provided with a crank and crank pin, of an annular ball member the bore of which is engaged by the pin while its outer surface is of annular part-spherical form, a one-piece socket rigidly connected to a part to be operated and having an annular part-spherical surface engaged by the part-spherical surface of the ball member, the ball member comprising at least two separable parts whose abutting faces are parallel to the axis of the ball member, each ball part constituting a circumferential part of the annular outer surface of the ball one of which can be inserted first into the socket whereupon the other part or parts can be inserted to form the complete ball member prior to sliding the pin into the bore thereof, means for supplying lubricating oil through the crankshaft to the interior of the crank pin, holes in the crank pin through which this lubricating oil is fed to the cylindrical surface thereof, and holes in the ball member through which lubricating oil can pass from this surface to the part-spherical surfaces.

13. A ball and socket joint comprising an annular one-piece socket having an annular part-spherical inner surface, an annular ball member having an annular part-spherical outer surface, and a pin adapted for insertion into the bore of the ball member, the ball member being divided into two parts only having abutting plane faces which are parallel to the ball member each ball part constituting a circumferential part of the annular outer surface of the ball, and the two ball parts being arranged and dimensioned in relation to the socket so that one ball part can be inserted first into the socket whereupon the other ball part can be inserted and slid over the plane faces of the first part into normal position completing the ball member.

14. A ball and socket joint comprising an annular one-piece socket having an annular part-spherical inner surface, an annular ball member having an annular part-spherical outer surface, and a pin adapted for insertion into the bore of the ball member, the ball member being divided into two parts only along a plane of division of the ball parts which contain the axis of the ball member, each ball part constituting a semi-circumferential part of the annular outer surface of the ball, the ball parts being arranged and dimensioned with reference to the socket so that one ball part can be inserted first into the socket whereupon the other part can be inserted and slid along the plane of division between the ball parts into normal position completing the ball member.

FRANK BERNARD HALFORD.
BENJAMIN WILLIAM BARLOW.